(12) United States Patent
Kawata

(10) Patent No.: US 11,807,060 B2
(45) Date of Patent: Nov. 7, 2023

(54) VEHICLE HEIGHT ADJUSTING DEVICE

(71) Applicant: TOYOTA JIDOSHA KABUSHIKI KAISHA, Aichi-ken (JP)

(72) Inventor: Takumi Kawata, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 436 days.

(21) Appl. No.: 17/137,369

(22) Filed: Dec. 30, 2020

(65) Prior Publication Data

US 2021/0245568 A1   Aug. 12, 2021

(30) Foreign Application Priority Data

Feb. 6, 2020 (JP) .................................. 2020-018919

(51) Int. Cl.
*B60G 17/015* (2006.01)
*B60G 11/27* (2006.01)

(52) U.S. Cl.
CPC .......... *B60G 17/0155* (2013.01); *B60G 11/27* (2013.01); *B60G 2202/152* (2013.01); *B60G 2400/252* (2013.01); *B60G 2400/52* (2013.01); *B60G 2500/30* (2013.01); *B60G 2600/044* (2013.01); *B60G 2800/914* (2013.01)

(58) Field of Classification Search
None
See application file for complete search history.

(56) References Cited

U.S. PATENT DOCUMENTS

| | | | |
|---|---|---|---|
| 2009/0069993 A1* | 3/2009 | Inoue | B60W 40/06 701/70 |
| 2015/0145220 A1* | 5/2015 | Yellambalase | B60G 17/0165 280/5.514 |
| 2016/0272035 A1 | 9/2016 | Oishi et al. | |
| 2018/0312165 A1 | 11/2018 | Dudar | |

FOREIGN PATENT DOCUMENTS

| | | |
|---|---|---|
| CN | 108790630 A | 11/2018 |
| DE | 102016104985 A1 | 9/2016 |
| DE | 102017002634 A1 | 11/2017 |
| DE | 102017111054 A1 | 11/2018 |
| EP | 2878462 A2 | 6/2015 |
| JP | 2002274144 A | 9/2002 |
| JP | 201834573 A | 3/2018 |

\* cited by examiner

*Primary Examiner* — Lail A Kleinman
(74) *Attorney, Agent, or Firm* — HAUPTMAN HAM, LLP

(57) ABSTRACT

A vehicle height adjusting device includes a vehicle height adjusting unit, a prediction unit, and a vehicle height control unit. The vehicle height adjusting unit adjusts a vehicle height to one of a first state and a second state. In the first state, the vehicle height is set to a predetermined height, and in the second state, the vehicle height is set lower than the first state. The prediction unit predicts whether a drive battery (lower portion) of a vehicle interferes with a road surface in the second state. The vehicle height control unit controls the vehicle height adjusting unit to set the vehicle height to one of the first state and the second state. When the prediction unit predicts an interference between the drive battery of the vehicle and the road surface, the vehicle height adjusting unit restricts a transition from the first state to the second state.

8 Claims, 11 Drawing Sheets

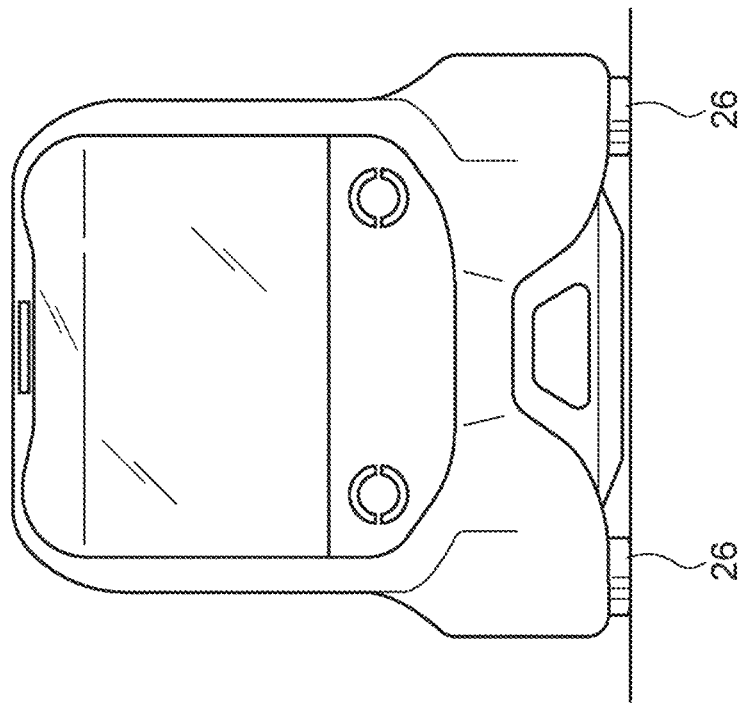
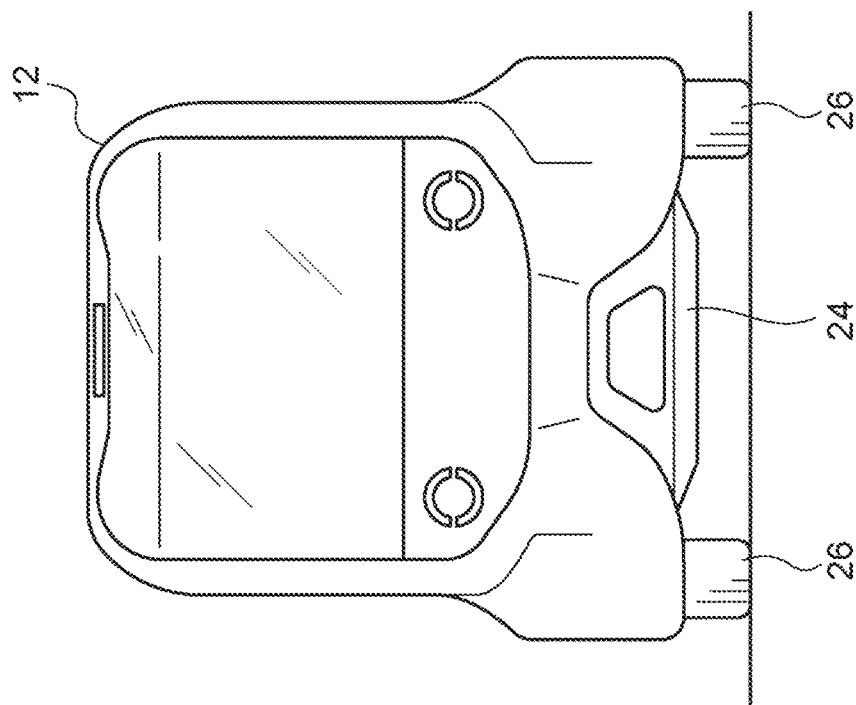

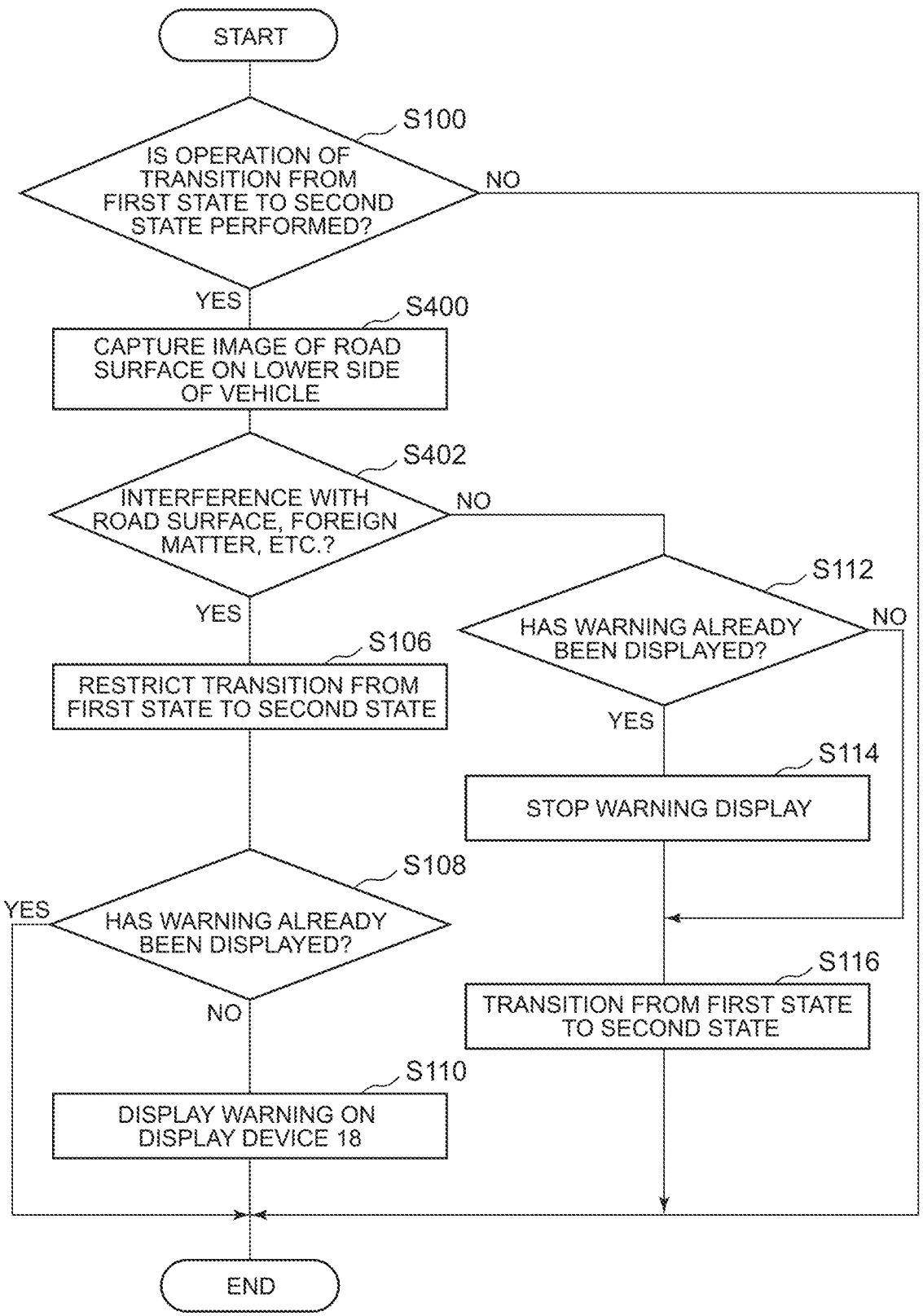

VEHICLE HEIGHT ADJUSTING DEVICE

CROSS-REFERENCE TO RELATED APPLICATION

This application claims priority to Japanese Patent Application No. 2020-018919 filed on Feb. 6, 2020, incorporated herein by reference in its entirety.

BACKGROUND

1. Technical Field

The present disclosure relates to a vehicle height adjusting device.

2. Description of Related Art

Japanese Unexamined Patent Application Publication No. 2002-274144 (JP 2002-274144 A) discloses a vehicle height adjusting device. The vehicle height adjusting device is capable of adjusting the vehicle height by supplying or discharging compressed air to/from the air suspension. This enables so-called kneeling in which the vehicle height is lowered from the normal traveling state in order to improve the ease of getting on and off the vehicle when the vehicle is stopped.

SUMMARY

However, in the case of the configuration disclosed in JP 2002-274144 A, when kneeling is performed when the tire pressure is low or there is an obstacle on the road surface, the lower portion of the vehicle may interfere with the road surface or the like. Therefore, the above prior art has room for improvement in this respect.

The present disclosure provides a vehicle height adjusting device capable of suppressing the lower portion of the vehicle from interfering with the road surface during vehicle height adjustment.

The vehicle height adjusting device according to an aspect of the present disclosure includes: a vehicle height adjusting unit configured to set a vehicle height to a first state or a second state, the first state being a state in which a tire of a vehicle is suspended at a predetermined position with respect to a vehicle body in a vehicle up-down direction, and the second state being a state in which the tire is suspended at a position closer to the vehicle body in the vehicle up-down direction than in the first state; a prediction unit that predicts whether a lower portion of the vehicle interferes with a road surface in the second state; and a vehicle height control unit that controls the vehicle height adjusting unit such that the vehicle height adjusting unit sets the vehicle height to one of the first state and the second state, and that restricts a transition from the first state to the second state by the vehicle height adjusting unit when the prediction unit predicts an interference between the lower portion of the vehicle and the road surface.

According to this configuration, the vehicle height adjusting device includes the vehicle height adjusting unit, the prediction unit, and the vehicle height control unit, and of the above, the vehicle height adjusting unit can set the vehicle height to the first state and the second state. The first state is a state in which the tires of the vehicle are suspended at predetermined positions with respect to the vehicle body in the vehicle up-down direction, and the second state is a state in which the tires are suspended at positions closer to the vehicle body in the vehicle up-down direction as compared with the first state. That is, in the second state, the vehicle height is lower than that in the first state. The prediction unit predicts whether the lower portion of the vehicle interferes with the road surface in the second state. The vehicle height control unit controls the vehicle height adjusting unit to set the vehicle height to one of the first state and the second state. Further, when the prediction unit predicts that the lower portion of the vehicle interferes with the road surface, the vehicle height adjusting unit restricts the transition from the first state to the second state. Therefore, by transitioning from the second state to the first state, it is possible to suppress the lower portion of the vehicle from interfering with the road surface when the vehicle height of the vehicle is lowered (when the vehicle height is adjusted).

Here, the "road surface" includes not only the surface of the actual road but also the shoulder of the road, boundary blocks, foreign matters on the road, road studs and markers embedded in the road surface, road markings, and the like.

The prediction unit may compare an air pressure of the tire of the vehicle, which is detected by an air pressure detecting unit, with a predetermined threshold, and when the detected air pressure is smaller than the predetermined threshold, predict the interference between the lower portion of the vehicle and the road surface.

According to this configuration, the prediction unit compares the air pressures detected by the air pressure detecting unit with the predetermined threshold, and predicts the interference between the lower portion of the vehicle and the road surface when the detected air pressures are smaller than the predetermined threshold. That is, the air pressures of the tires that are easily measured are used for the determination, and it is possible to suppress the lower portion of the vehicle from interfering with the road surface when the transition from the first state to the second state is performed in the state where the lower portion of the vehicle has approached the road surface due to the decrease in the air pressures of the tires. Thus, it is possible to suppress the interference between the lower portion of the vehicle and the road surface during the vehicle height adjustment with a simple configuration.

The vehicle height adjusting device according to the aspect of the present disclosure may include a calculation unit that calculates a remaining interference time until the lower portion of the vehicle interferes with the road surface, based on a rate of decrease in an air pressure of the tire of the vehicle, which is detected by an air pressure detecting unit. The prediction unit may compare the detected air pressure with a predetermined threshold, and when the detected air pressure is smaller than the predetermined threshold and the remaining interference time that has been calculated is shorter than a predetermined time, predict the interference between the lower portion of the vehicle and the road surface.

According to this configuration, the calculation unit calculates the remaining interference time until the lower portion of the vehicle interferes with the road surface based on the rate of decrease in the air pressures of the tires detected by the air pressure detecting unit. The prediction unit compares the detected air pressures with the predetermined threshold, and when the detected air pressures are smaller than the predetermined threshold and the remaining interference time that has been calculated is shorter than the predetermined time, predicts the interference between the lower portion of the vehicle and the road surface. That is, if the transition from the first state to the second state is performed when the rate of decrease in the air pressures of the tires is high due to a flat tire or the like and the remaining interference time is small, the lower portion of the vehicle may interfere with the road surface. That is, by restricting the transition from the first state to the second state when the air pressures of the tires are equal to or smaller than the threshold and the remaining interference time is shorter than the predetermined time, the interference between the lower portion of the vehicle and the road surface can be suppressed. Thus, it is possible to more reliably suppress the interference between the lower portion of the vehicle and the road surface during the vehicle height adjustment.

The vehicle height control unit may temporarily permit the transition from the first state to the second state when the detected air pressure is smaller than a predetermined threshold and the remaining interference time that has been calculated is longer than the predetermined time.

According to this configuration, the vehicle height control unit temporarily permits the transition from the first state to the second state when the detected air pressures are smaller than the predetermined threshold and the remaining interference time is longer than the predetermined time. That is, if the air in the tires is only naturally reduced and not punctured, the remaining interference time increases, and in this case, even if the transition from the first state to the second state is performed, the lower portion of the vehicle may not interfere with the road surface depending on the vehicle height in the second state. Therefore, by temporarily permitting the transition from the first state to the second state, it is possible to expand the available range of the vehicle height adjustment while suppressing the interference between the lower portion of the vehicle and the road surface. In this way, it is possible to suppress the interference between the lower portion of the vehicle and the road surface and improve usability during the vehicle height adjustment at the same time.

The vehicle height adjusting unit may change at least one tire of a plurality of the tires provided in the vehicle to the one of the first state and the second state. The prediction unit may change the predetermined threshold that is compared with an air pressure of the tire for which a state is changed by the vehicle height adjusting unit to a value different from the predetermined threshold that is compared with an air pressure of the tire other than the at least one tire.

According to this configuration, since the vehicle height adjusting unit changes at least one tire of the plurality of the tires provided in the vehicle to one of the first state and the second state, it is possible to save energy as compared with the case of adjusting the vehicle height of the entire vehicle. Further, the prediction unit changes the predetermined threshold that is compared with the air pressure of the tire changed to either the first state or the second state by the vehicle height adjusting unit to a value different from the predetermined threshold that is compared with the air pressure of the tire other than the at least one tire. That is, when the lower portion of the vehicle has already approached the road surface, such as when the air pressure of the tire that is transitioned to the second state has not decreased but the air pressures of the other tires that are not transitioned to the second state have decreased, the predetermined threshold for the tire that is transitioned to the second state can be made larger than the predetermined threshold for the other tires that are not transitioned to the second state. As a result, when the air pressure of the tire corresponding to the position where the vehicle height is adjusted has not decreased but the air pressures of the other tires have decreased and thus the lower portion of the vehicle is approaching the road surface, it is possible to suppress the lower portion of the vehicle from interfering with the road surface due to the transition from the first state to the second state. In this way, it is possible to suppress the interference between the lower portion of the vehicle and the road surface and save energy during the vehicle height adjustment at the same time.

The prediction unit may detect a road surface condition and predict whether the lower portion of the vehicle interferes with the road surface based on the road surface condition.

According to this configuration, since the prediction unit predicts whether the lower portion of the vehicle interferes with the road surface from the road surface condition detected by the road surface detecting unit, it is possible to suppress the interference between the lower portion of the vehicle and the road surface based on the actual situation of the vehicle. Thus, it is possible to suppress the interference between the lower portion of the vehicle and the road surface during the vehicle height adjustment according to various situations.

The vehicle may be equipped with a battery in a lower portion of the vehicle.

According to this configuration, the vehicle is equipped with the battery in the lower portion of the vehicle. By mounting the battery in the lower portion of the vehicle where a space is relatively easily secured, the battery can be increased in size and the battery can be suppressed from interfering with the road surface. In this way, the battery can be protected.

The vehicle height adjusting device according to the aspect of the present disclosure may include a display generation unit that generates a warning when the vehicle height control unit restricts the transition from the first state to the second state; and a display unit that displays the warning generated by the display generation unit to an occupant of the vehicle.

According to this configuration, since the vehicle height adjusting device includes the display generation unit that generates a warning and the display unit for displaying the warning generated by the display generation unit to the occupant of the vehicle when the vehicle height control unit restricts the transition from the first state to the second state, the occupant can grasp that the transition from the first state to the second state is restricted. In this way, it is easier for the occupant to grasp the situation of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a front view showing a first state of a vehicle having the vehicle height adjusting device according to the first embodiment;

FIG. 4B is a front view showing a state shifted to a second state from FIG. 4A;

FIG. 12 is a flowchart showing an operation flow of the vehicle height adjusting device according to the fourth embodiment.

DETAILED DESCRIPTION OF EMBODIMENTS

First Embodiment

Hereinafter, a vehicle height adjusting device 10 will be described according to a first embodiment with reference to FIGS. 1 to 4B. Hereinafter, when the description is made simply using terms indicating directions i.e., forward and rearward, right and left, and upward and downward, these means forward and rearward in the vehicle front-rear direction, right and left in the vehicle right-left direction (vehicle width direction), and upward and downward in the vehicle up-down direction unless otherwise specified.

Hardware Configuration

Figure 1:
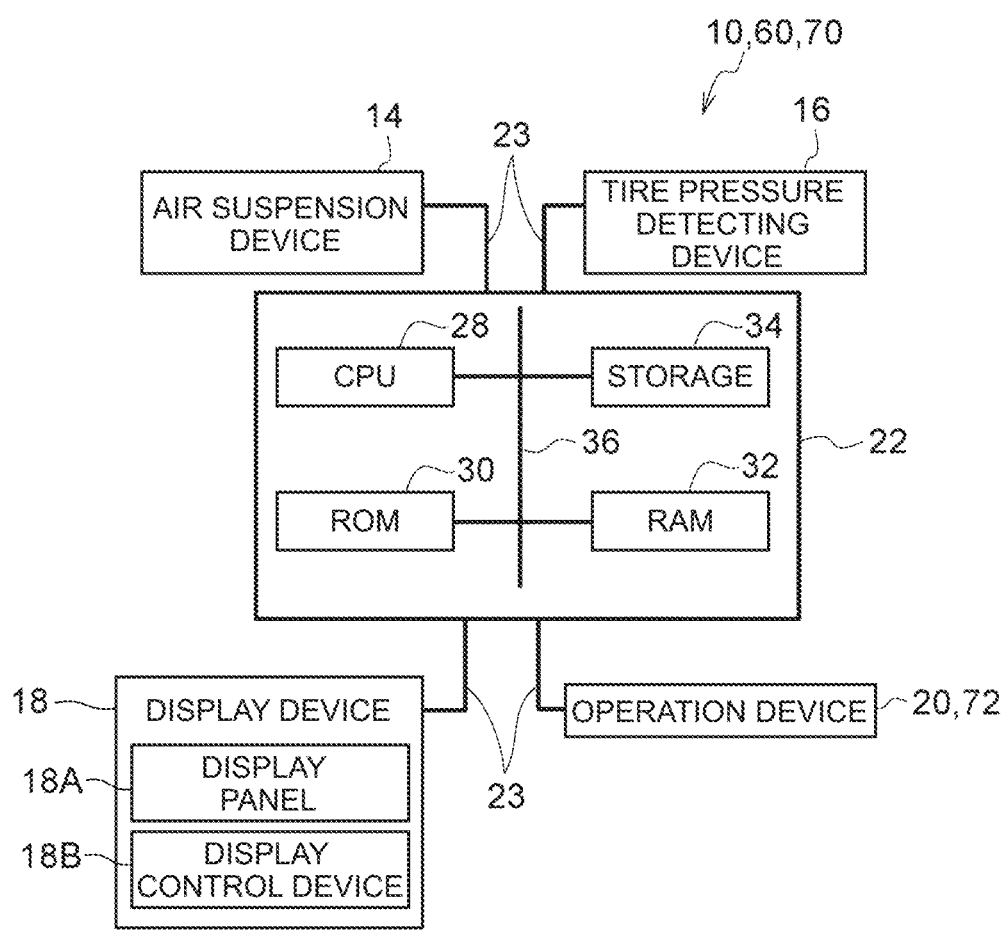
FIG. 1 is a block diagram showing a hardware configuration of a vehicle height adjusting device according to first to third embodiments.

FIG. 1 is a block diagram showing a hardware configuration of the vehicle height adjusting device 10. The vehicle height adjusting device 10 is provided in the vehicle 12 (see FIGS. 4A and 4B), and includes an air suspension device 14, a tire pressure detecting device 16, a display device 18, an operation device 20, and a control device 22. Each component is connected to each other via an in-vehicle network 23.

As an example, the vehicle 12 is an electric vehicle and a shared vehicle in which a drive battery 24 serving as a battery is mounted on the lower portion (under the floor) of the vehicle (see FIGS. 4A and 4B), and has an entrance and exit (not shown) for occupants on one side in the vehicle width direction. The vehicle 12 has a plurality of (four in the present embodiment) tires 26 (see FIGS. 4A and 4B), and each of the tires 26 is suspended from the vehicle body by the air suspension device 14.

The air suspension device 14 includes air springs, an air tank, a valve, and a control unit (all not shown). Each of the air springs is provided between an axle, which serves as the center of rotation of each tire 26, and the vehicle body and expands substantially in the vehicle up-down direction with air supplied to the inside. Due to the expansion of the air springs, the tires 26 and the vehicle body are distanced from each other in the vehicle up-down direction, so that the vehicle height of the vehicle 12 is increased. On the other hand, the air springs contract substantially in the vehicle up-down direction when air is discharged from the inside. Due to the contraction of the air springs, the tires 26 and the vehicle body approach each other in the vehicle up-down direction, so that the vehicle height of the vehicle 12 is lowered. The air springs are connected to the air tank, and the valve controlled by the control unit enables the movement of air between the air springs and the air tank. Thus, the vehicle height of the vehicle 12 can be adjusted by controlling the control unit. The air suspension device 14 is capable of transmitting expansion/contraction information of the air springs to the control device 22.

The tire pressure detecting device 16 includes air pressure sensors, a receiver, and an air pressure sensor control device (all not shown). Each of the air pressure sensors is fixed to the rim portion of a wheel (not shown) of each tire 26, and detects the air pressure in the tire 26. The detected air pressure is transmitted to the receiver through wireless signals. The receiver transmits the received wireless signals to the air pressure sensor control device that is communicably connected to the receiver. The air pressure sensor control device calculates the air pressures in the tires 26 based on the signals received from the receiver, and transmits the calculated air pressures as air pressure information to the control device 22, whereby the control device 22 stores the air pressure information. With the above configuration, the air pressure of each tire 26 is detected.

The display device 18 includes a display panel 18A as a display unit and a display control device 18B as a display generation unit. The display panel 18A is composed of a liquid crystal panel provided in the meter cluster of the instrument panel provided in the driver's seat, and can display various displays to the vehicle cabin, such as a warning generated by the display control device 18B that is communicably connected to the display panel 18A.

The operation device 20 includes an operation button (not shown) provided on the instrument panel of the driver's seat. The operation button is used by the occupant to set the vehicle height to either the first state or the second state to adjust the vehicle height.

The control device 22 has therein a central processing unit (CPU) 28, a read only memory (ROM) 30, a random access memory (RAM) 32, and a storage 34. Each configuration is communicably connected to each other via a bus 36.

The CPU 28 is a central arithmetic processing unit that executes various programs and controls each unit. That is, the CPU 28 reads a program from the ROM 30 or the storage 34, and executes the program using the RAM 32 as a work area. The CPU 28 controls each of the above configurations and performs various arithmetic processes according to the programs stored in the ROM 30 or the storage 34. In the present embodiment, the ROM 30 or the storage 34 stores a vehicle height adjusting program for adjusting the vehicle height of the vehicle 12.

The ROM 30 stores various programs and various data. The RAM 32 temporarily stores a program or data as a work area. The storage 34 is composed of a hard disk drive (HDD) or a solid state drive (SSD), and stores various programs including an operating system and various data.

Functional Configuration

When executing the above-described vehicle height adjusting program, the vehicle height adjusting device 10 realizes various functions using the above-described hardware resources. The functional configuration realized by the vehicle height adjusting device 10 will be described.

Figure 2:
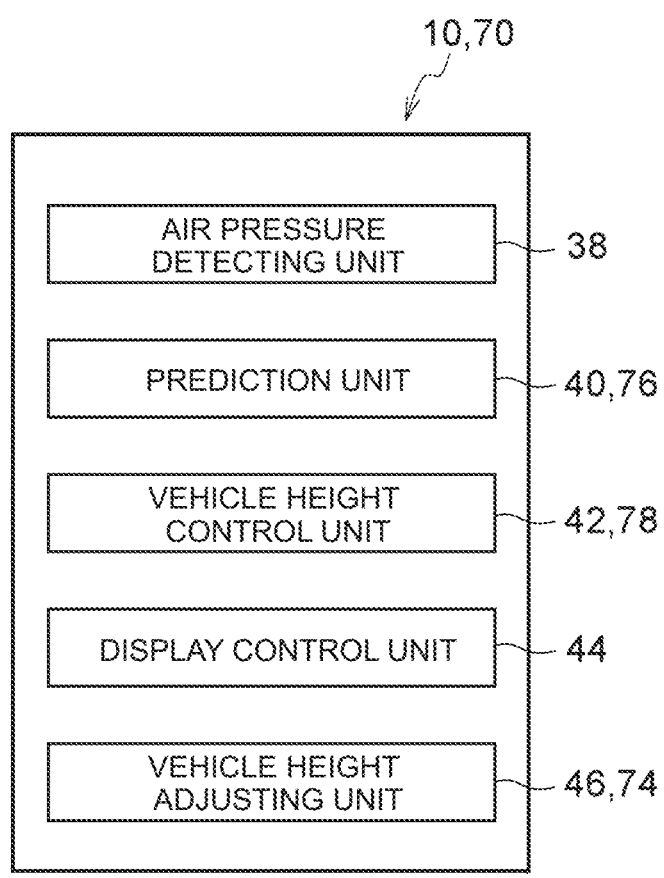
FIG. 2 is a block diagram showing a functional configuration of the vehicle height adjusting device according to the first and third embodiments.

FIG. 2 is a block diagram showing an example of the functional configuration of the vehicle height adjusting device 10.

As shown in FIG. 2, the vehicle height adjusting device 10 has an air pressure detecting unit 38, a prediction unit 40, a vehicle height control unit 42, a display control unit 44, and a vehicle height adjusting unit 46 as the functional configuration. The CPU 28 of the control device 22 reads and executes the vehicle height adjusting program stored in the ROM 30 or the storage 34 (see FIG. 1), thereby realizing each functional configuration.

The air pressure detecting unit 38 acquires the air pressure information of each tire 26 from the tire pressure detecting device 16 and transmits the air pressure information to the prediction unit 40.

The prediction unit 40 compares the air pressure of the tire 26 based on the air pressure information received from the air pressure detecting unit 38 with a predetermined threshold, and predicts whether the drive battery 24 of the vehicle 12 interferes with the road surface based on the comparison result. Specifically, when the air pressure of any of the tires 26 is smaller than the threshold, the distance between the drive battery 24 of the vehicle 12 and the road surface is smaller than when the air pressure is larger than the threshold. If a transition from the first state to the second state, which will be described later, is performed in this state, there is a high possibility that the drive battery 24 of the vehicle 12 interferes with the road surface. Thus, when the air pressure of the tire 26 is smaller than the threshold, the prediction unit 40 predicts that the drive battery 24 of the vehicle 12 interferes with the road surface, and transmits the prediction result to the vehicle height control unit 42.

The vehicle height control unit 42 controls the vehicle height adjusting unit so that the vehicle height of the vehicle 12 is set to either the first state or the second state based on the input from the operation device 20, and on receiving from the prediction unit 40 the prediction result that the drive battery 24 of the vehicle 12 interferes with the road surface, restricts the transition from the first state to the second state. When restricting the transition from the first state to the second state, the vehicle height control unit 42 transmits the information to the display control unit 44.

The display control unit 44 acquires and controls the operating status and display contents of the display device 18, and on receiving information from the vehicle height control unit 42 to restrict the transition from the first state to the second state, controls the display device 18 such that the display device 18 displays a warning indicating the restriction. Thus, the display device 18 generates a warning indicating that the transition from the first state to the second state is restricted, and displays the warning.

The vehicle height adjusting unit 46 controls the air suspension device 14 according to the determination result of the vehicle height control unit 42. Specifically, the vehicle height adjusting unit 46 controls the air suspension device 14 so that the vehicle height of the vehicle 12 is set to either the first state or the second state. The first state is a state in which the vehicle 12 is in a normal traveling state, and is a state in which the air springs of the air suspension device 14 are expanded and the tires 26 are suspended at predetermined positions with respect to the vehicle body in the vehicle up-down direction. As a result, the vehicle height becomes a predetermined height. Specifically, the predetermined vehicle height in the first state is a vehicle height in which the distance between a member of the vehicle 12 located at the lowermost end of the vehicle 12 (drive battery 24 as an example in the present embodiment) and the road surface is equal to or larger than the minimum ground height defined by the safety standard. On the other hand, the second state is a state in which the occupants get on and off the vehicle 12, and is a state in which the air springs of the air suspension device 14 are contracted and the tires 26 are suspended at positions closer to the vehicle body in the vehicle up-down direction as compared with the first state. The vehicle height in the second state is a state in which the vehicle height is lower than that in the first state to such an extent that the drive battery 24 does not interfere with the road surface. In the vehicle 12, the first state is the basic state.

Processing Flow

Figure 3:
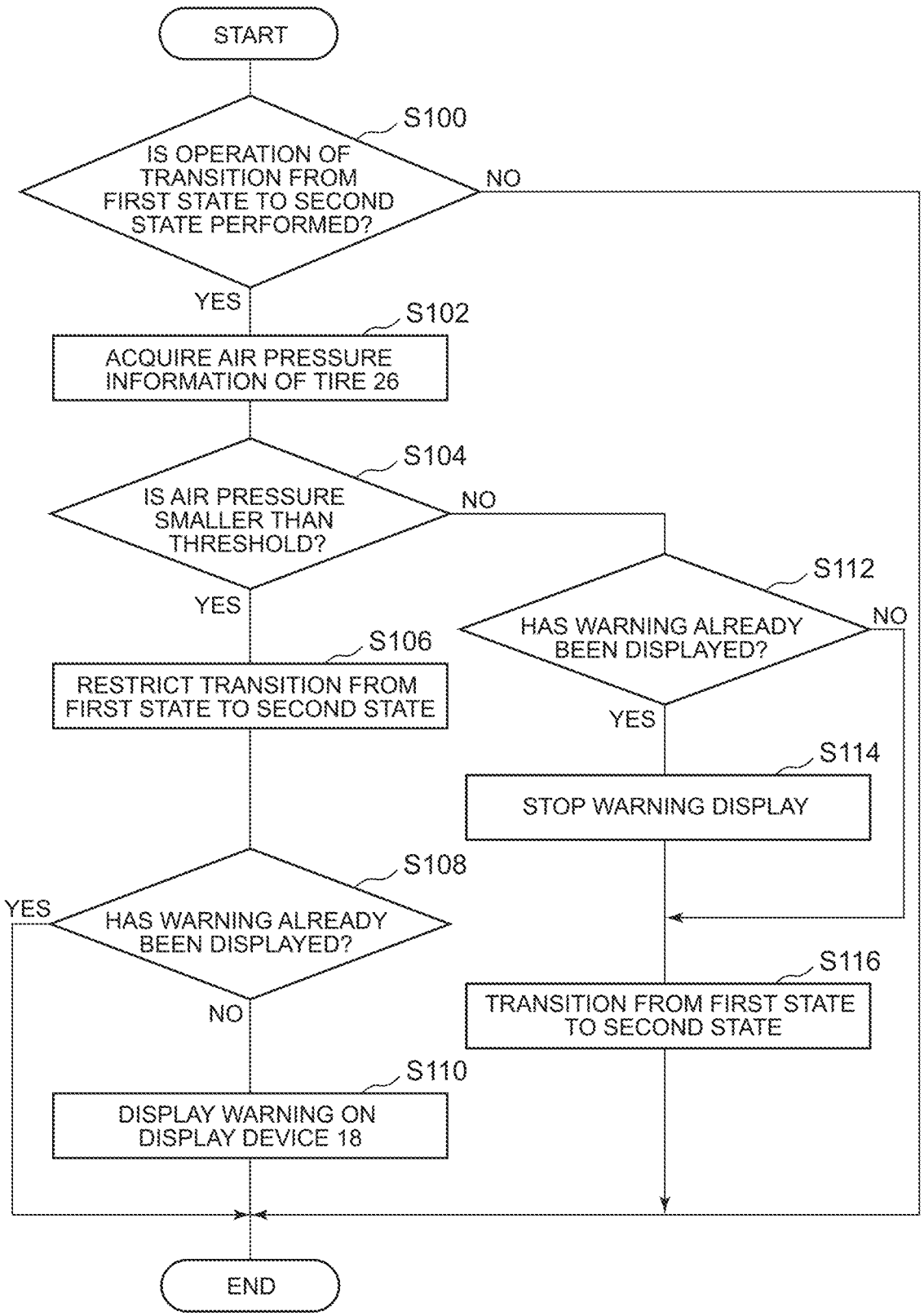
FIG. 3 is a flowchart showing an operation flow of the vehicle height adjusting device according to the first embodiment.

Next, the operation of the vehicle height adjusting device 10 will be described. FIG. 3 is a flowchart showing the flow of operation of the vehicle height adjusting device 10. The CPU 28 reads the vehicle height adjusting program from the ROM 30 or the storage 34, runs the program in the RAM 32, and executes the program, thereby performing the vehicle height adjustment.

The CPU 28 determines whether the vehicle 12 has been operated by the operation device 20 to transition from the first state to the second state (step S100). When the operation of the transition from the first state to the second state is not performed (step S100: NO), the CPU 28 ends the process based on the vehicle height adjusting program.

When the operation of the transition from the first state to the second state is performed (step S100: YES), the CPU 28 acquires the air pressure information of each tire 26 from the tire pressure detecting device 16 (step S102). Then, the CPU 28 determines whether the acquired air pressures of the tires 26 are smaller than the threshold (step S104). When the acquired air pressures of the tires 26 are smaller than the threshold (step S104: YES), the CPU 28 restricts the transition of the vehicle 12 from the first state to the second state (step S106).

Subsequently, the CPU 28 determines whether the display device 18 has already displayed a warning indicating that the transition from the first state to the second state is restricted (step S108). When the warning indicating that the transition from the first state to the second state is restricted is already being displayed on the display device 18 (when a warning indicating that the transition from the first state to the second state is restricted has been displayed at the time of the previous operation and the warning remains displayed) (step S108: YES), the CPU 28 ends the process based on the vehicle height adjusting program. On the other hand, when the display device 18 does not display a warning indicating that the transition from the first state to the second state is restricted (step S108: NO), the CPU 28 causes the display device 18 to display the warning indicating that the transition from the first state to the second state is restricted (step S110). After that, the processing based on the vehicle height adjusting program is ended.

When the air pressures of the tires 26 acquired in step S104 are larger than the threshold (step S104: NO), the CPU 28 determines whether the display device 18 has already displayed a warning indicating that the transition from the first state to the second state is restricted (step S112). When the display device 18 does not display a warning indicating that the transition from the first state to the second state is restricted (step S112: NO), the CPU 28 transitions to the process of step S116 described later.

When the display device 18 displays a warning indicating that the transition from the first state to the second state is restricted (step S112: YES), the CPU 28 causes the display device 18 to stop displaying the warning indicating that the transition from the first state to the second state is restricted (step S114), and transitions the vehicle height from the first state to the second state (step S116). After that, the processing based on the vehicle height adjusting program is ended.

Operations and Effects of First Embodiment

Next, operations and effects of the first embodiment will be described.

In the present embodiment, as shown in FIG. 2, the vehicle height adjusting device 10 includes the vehicle height adjusting unit 46, the prediction unit 40, and the vehicle height control unit 42, and of the above, the vehicle height adjusting unit 46 can set a vehicle height to a first state and a second state. The first state is a state in which the tires 26 of the vehicle 12 are suspended at predetermined positions with respect to the vehicle body in the vehicle up-down direction (see FIG. 4A), and the second state is a state in which the tires 26 are suspended at positions closer to the vehicle body in the vehicle up-down direction as compared with the first state (see FIG. 4B). That is, in the second state, the vehicle height is lower than that in the first state. The prediction unit 40 predicts whether the drive battery 24 (lower portion) of the vehicle 12 interferes with the road surface in the second state. The vehicle height control unit 42 controls the vehicle height adjusting unit 46 to set the vehicle height to either the first state or the second state. Further, when the prediction unit 40 predicts that the lower portion of the vehicle 12 interferes with the road surface, the vehicle height adjusting unit 46 restricts the transition from the first state to the second state. Therefore, by transitioning from the second state to the first state, it is possible to suppress the drive battery 24 of the vehicle 12 from interfering with the road surface when the vehicle height of the vehicle 12 is lowered. As a result, it is possible to suppress the drive battery 24 of the vehicle 12 from interfering with the road surface during the vehicle height adjustment.

Further, the prediction unit 40 compares the air pressures detected by the air pressure detecting unit 38 with a predetermined threshold, and predicts the interference between the drive battery 24 of the vehicle 12 and the road surface when the air pressures are smaller than the threshold. That is, the air pressures of the tires 26 that are easily measured are used for the determination, and it is possible to suppress the drive battery 24 of the vehicle 12 from interfering with the road surface when the vehicle 12 is transitioned from the first state to the second state in the state in which the drive battery 24 of the vehicle 12 has approached the road surface due to the decrease in the air pressures of the tires 26. Thus, it is possible to suppress the drive battery 24 of the vehicle 12 from interfering with the road surface during the vehicle height adjustment with a simple configuration.

Further, the vehicle 12 is equipped with the drive battery 24 in the lower portion of the vehicle 12. Thus, by mounting the drive battery 24 in the lower portion of the vehicle 12 where a space is relatively easily secured, the drive battery 24 can be increased in size and the drive battery 24 can be suppressed from interfering with the road surface. Therefore, the drive battery 24 can be protected.

Furthermore, since the vehicle height adjusting device 10 includes the display control device 18B that generates a warning and the display panel 18A for displaying the warning generated by the display control device 18B to the occupant of the vehicle 12 when the vehicle height control unit 42 restricts the transition from the first state to the second state, the occupant can grasp that the transition from the first state to the second state is restricted. This makes it easier for the occupant to grasp the situation of the vehicle 12.

Second Embodiment

Next, the vehicle height adjusting device according to the second embodiment of the present disclosure will be described with reference to FIGS. 5 to 7. The same components as those in the first embodiment, etc. described above are denoted by the same reference signs and the description thereof will be omitted.

A vehicle height adjusting device 60 according to the second embodiment has the same basic configuration as that of the first embodiment, and is characterized in that a calculation unit 62 is provided.

Functional Configuration

That is, the vehicle height adjusting device 60 is provided in the vehicle 12 (see FIGS. 4A and 4B), and includes the air suspension device 14, the tire pressure detecting device 16, the display device 18, the operation device 20, and the control device 22. Each component is connected to each other via the in-vehicle network 23 (see FIG. 1).

Functional Configuration

When executing the vehicle height adjusting program, the vehicle height adjusting device 60 realizes various functions using the above-described hardware resources. The functional configuration realized by the vehicle height adjusting device 60 will be described.

Figure 5:
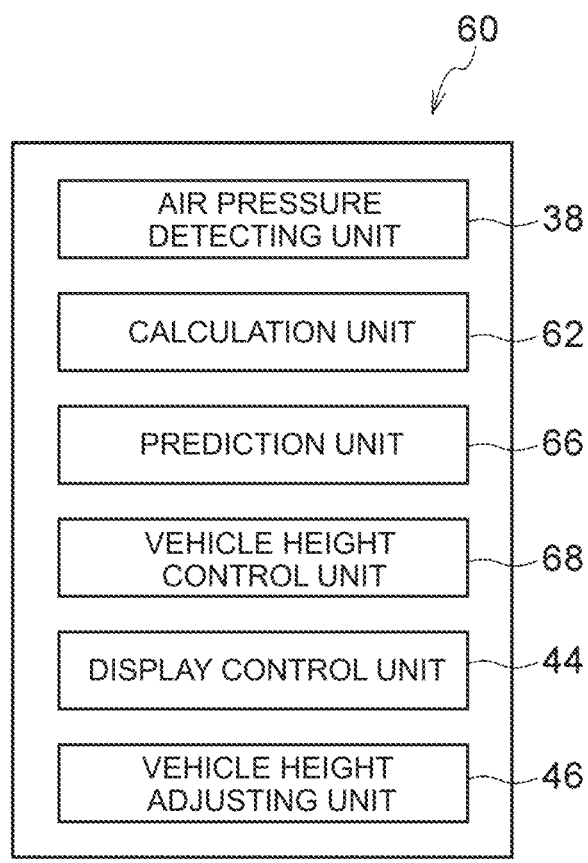
FIG. 5 is a block diagram showing a functional configuration of the vehicle height adjusting device according to the second embodiment.

FIG. 5 is a block diagram showing an example of the functional configuration of the vehicle height adjusting device 60.

As shown in FIG. 5, the vehicle height adjusting device 60 has the air pressure detecting unit 38, the calculation unit 62, a prediction unit 66, a vehicle height control unit 68, the display control unit 44, and the vehicle height adjusting unit 46 as the functional configuration. The CPU 28 of the control device 22 reads and executes the vehicle height adjusting program stored in the ROM 30 or the storage 34 (see FIG. 1), thereby realizing each functional configuration.

The calculation unit 62 acquires the expansion/contraction information of the air springs from the air suspension device 14 and estimates the current vehicle height of the vehicle 12. Further, the calculation unit 62 stores the air pressure information received from the air pressure detecting unit 38 and calculates the fluctuation of the air pressures from the absolute values of the air pressures at a predetermined time. That is, the calculation unit 62 calculates a remaining interference time Ct (see FIG. 7) indicating the time remaining until the drive battery 24 of the vehicle 12 and the road surface interfere with each other, based on the rate of decrease in the air pressures calculated including the absolute values of the air pressures and a parameter related to the time. Specifically, the rate of decrease in the air pressures of the tires 26 is calculated by acquiring the absolute values of the air pressures at a plurality of time points within a predetermined time and calculating the amount of change (inclination) in the values of the air pressures. Then, based on the fluctuation, the calculation unit 62 calculates the approach speed at which the drive battery 24 of the vehicle 12 approaches the road surface and the remaining interference time Ct until the drive battery 24 of the vehicle 12 interferes with the road surface from the current vehicle height. The calculation unit 62 transmits the current vehicle height information and the remaining interference time information to the prediction unit 66.

The prediction unit 66 acquires the air pressure information of each tire 26 from the tire pressure detecting device 16 and compares the air pressures of the tires 26 with the threshold. At this time, when the air pressure of any of the tires 26 is smaller than the threshold, the prediction unit 66 determines that the tires 26 are in an air-reduced state, and compares the remaining interference time received from the calculation unit 62 with the predetermined time. Based on the comparison result, the prediction unit 66 predicts whether the drive battery 24 of the vehicle 12 interferes with the road surface. Specifically, as shown in FIG. 7, the prediction unit 66 compares the remaining interference time Ct at the current vehicle height and the time Ut (hereinafter referred to as "raising time") that serves as the predetermined time and that is required to raise the vehicle height by the air suspension device 14 until the vehicle height reaches the first state. When comparison result shows that the remaining interference time Ct is shorter than the raising time Ut (corresponding to area A in FIG. 7), even when the vehicle height is increased by the air suspension device 14, the vehicle height decreases faster than the increase in the vehicle height by the air suspension device 14 due to the decrease in the air pressure of the tires 26. That is, when the current vehicle height of the vehicle 12 is X, the remaining interference time Ct is t1 and the raising time Ut is t2. Thus, since the raising time Ut is longer than the remaining interference time Ct, even when the vehicle height is raised by the air suspension device 14, the raising speed cannot keep up with the decrease in the vehicle height, and there is a high possibility that the drive battery 24 of the vehicle 12 interferes with the road surface. Therefore, when the air pressure of any of the tires 26 is smaller than the threshold and the remaining interference time Ct is shorter than the raising time Ut, it is predicted that the drive battery 24 of the vehicle 12 interferes with the road surface, and the prediction result is transmitted to the vehicle height control unit 42. As an example, a case where "the remaining interference time Ct is shorter than the raising time Ut" includes a case of a flat tire or the like caused by damage to the tire 26 by a foreign matter.

Figure 6:
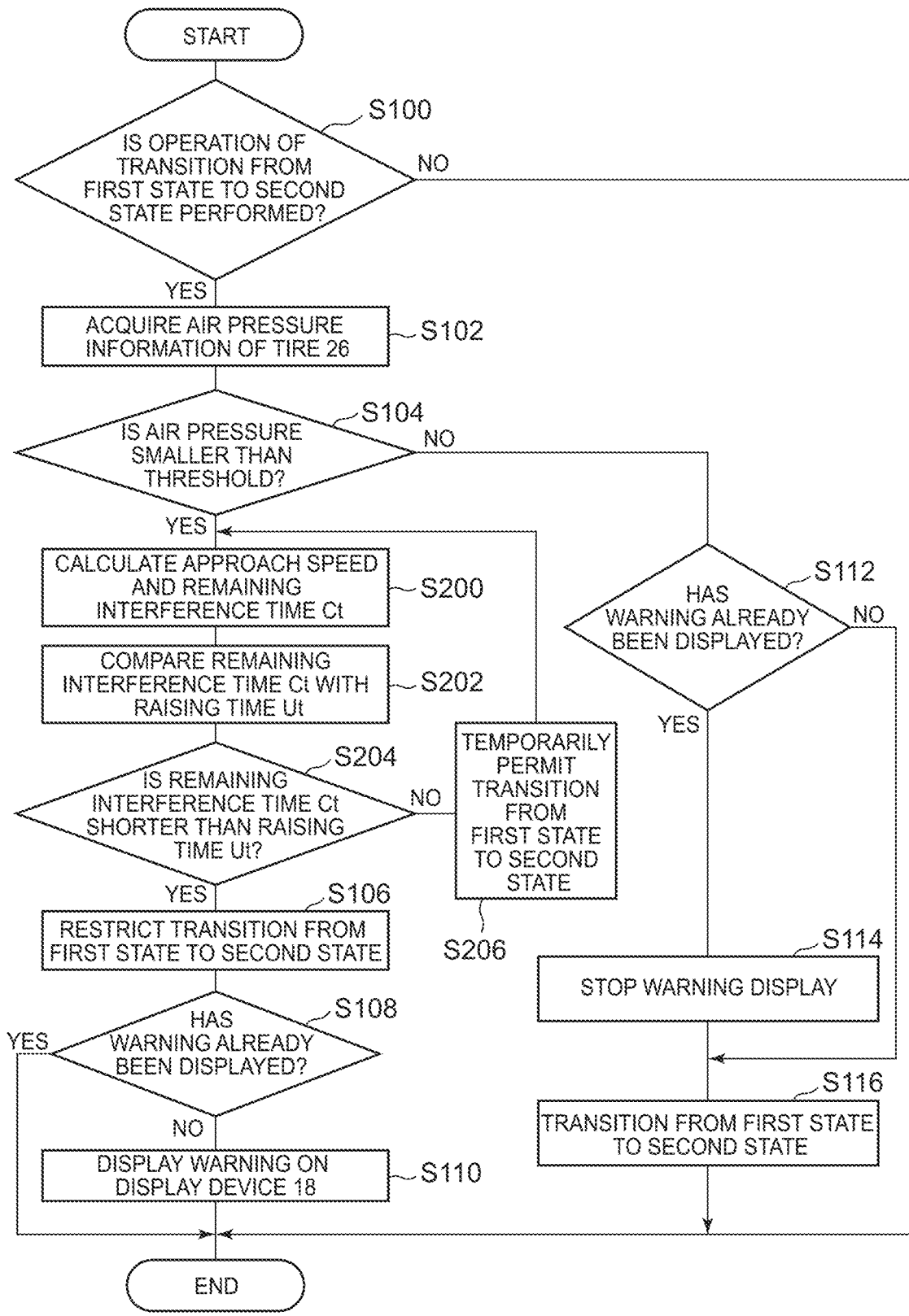
FIG. 6 is a flowchart showing an operation flow of the vehicle height adjusting device according to the second embodiment.
Figure 7:
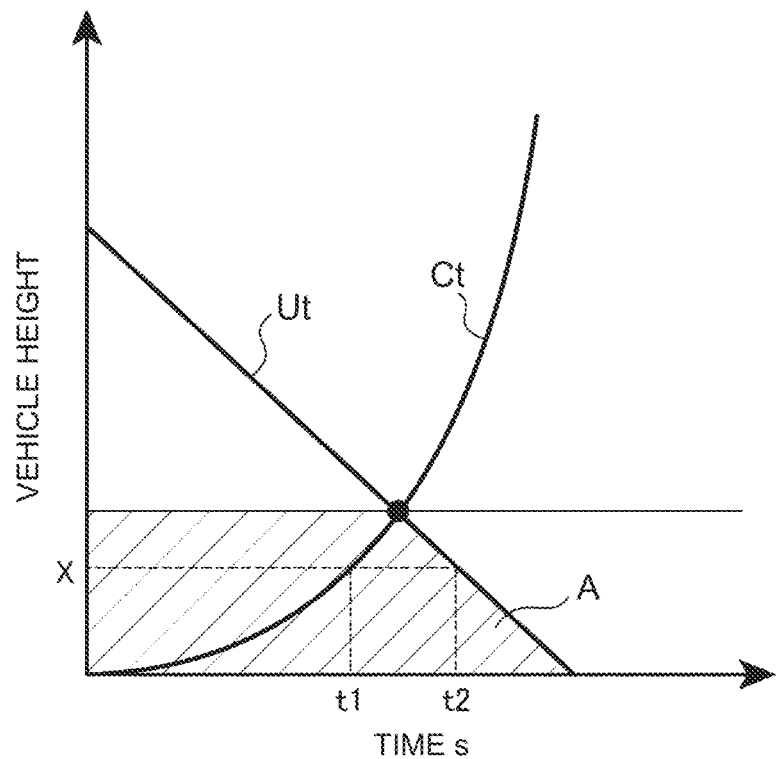
FIG. 7 is a graph showing a determination example of a prediction unit of the vehicle height adjusting device according to the second embodiment.

As shown in FIG. 6, the vehicle height control unit 68 temporarily permits the transition from the first state to the second state when the air pressure of the tire 26 is determined by the prediction unit 66 to be smaller than a predetermined threshold and the remaining interference time Ct is longer than the raising time Ut, that is, when the vehicle height of the vehicle 12 falls under a range other than the area A in FIG. 7. That is, if the air in the tire 26 is naturally reduced and not punctured, the approach speed is slower. In this case, the vehicle height is raised by the air suspension device 14 to suppress the drive battery 24 of the vehicle 12 from interfering with the road surface. The vehicle height control unit 68 temporarily permits the transition from the first state to the second state within a range in which the vehicle height of the vehicle 12 does not reach the area A in FIG. 7.

Processing Flow

Next, the operation of the vehicle height adjusting device 10 will be described. FIG. 6 is a flowchart showing the flow of operation of the vehicle height adjusting device 60. The CPU 28 reads the vehicle height adjusting program from the ROM 30 or the storage 34, runs the program in the RAM 32, and executes the program, thereby performing the vehicle height adjustment. The same processes as those in the first embodiment are denoted by the same reference signs and the description thereof will be omitted.

In step S104, when the acquired air pressures of the tires 26 are smaller than the threshold (step S104: YES), the CPU 28 calculates the approach speed and the remaining interference time Ct (step S200).

The CPU 28 compares the remaining interference time Ct with the raising time Ut (step S202), and determines whether the remaining interference time Ct is shorter than the raising time Ut (step S204). When the remaining interference time Ct is shorter than the raising time Ut (step S204: YES), the CPU 28 proceeds to the process of step S106.

On the other hand, when the remaining interference time Ct is longer than the raising time Ut (step S204: NO), the CPU 28 temporarily permits the transition from the first state to the second state (step S206), and proceeds to the process of step S200.

Operations and Effects of Second Embodiment

Next, operations and effects of the second embodiment will be described.

The above configuration has the same configuration as the vehicle height adjusting device 10 of the first embodiment except that the calculation unit 62 is provided, so that the same effect as that of the first embodiment can be obtained. Further, the calculation unit 62 calculates the remaining interference time Ct until the drive battery 24 of the vehicle 12 interferes with the road surface, from the rate of decrease in the air pressures of the tires 26 detected by the air pressure detecting unit 38, that is, the rate of decrease in the air pressures calculated including the absolute values of the air pressures and the parameter related to the time. The prediction unit 66 compares the air pressures with a predetermined threshold, and predicts the interference between the drive battery 24 of the vehicle 12 and the road surface when the air pressures are smaller than the threshold and the remaining interference time Ct calculated by the calculation unit 62 is shorter than the raising time Ut. That is, if the transition from the first state to the second state is performed when the rate of decrease in the air pressures of the tires 26 is high due to a flat tire or the like and the remaining interference time Ct is small, the lower portion of the vehicle 12 may interfere with the road surface. That is, by restricting the transition from the first state to the second state when the air pressures of the tires 26 are equal to or smaller than the threshold and the remaining interference time Ct is shorter than the raising time Ut, the interference between the drive battery 24 of the vehicle 12 and the road surface can be suppressed. As a result, it is possible to more reliably suppress the drive battery 24 of the vehicle 12 from interfering with the road surface during the vehicle height adjustment.

Further, the vehicle height control unit 68 temporarily permits the transition from the first state to the second state when the air pressures are smaller than the threshold and the remaining interference time Ct is longer than the raising time Ut. That is, if the air in the tires 26 is only naturally reduced and not punctured, the remaining interference time Ct increases, and in this case, even if the transition from the first state to the second state is performed, the drive battery 24 of the vehicle 12 may not interfere with the road surface depending on the vehicle height in the second state. Therefore, by temporarily permitting the transition from the first state to the second state, it is possible to expand the available range of the vehicle height adjustment while suppressing the interference between the drive battery 24 of the vehicle 12 and the road surface. As a result, it is possible to suppress interference between the drive battery 24 of the vehicle 12 and the road surface and improve usability during the vehicle height adjustment at the same time.

In the second embodiment described above, when the air pressures of the tires 26 are equal to or smaller than the threshold and the remaining interference time Ct is shorter than the raising time Ut, the transition from the first state to the second state is restricted. However, the present disclosure is not limited to this, and the transition from the first state to the second state may be restricted when the remaining interference time Ct is shorter than the raising time Ut, even if the air pressures of the tires 26 are equal to or larger than the threshold.

Further, the calculation unit 62 is configured to calculate the rate of decrease in the air pressures by acquiring the absolute values of the air pressures at a plurality of time points within a predetermined time and calculating the amount of change in the values of the air pressures. However, the present disclosure is not limited to this, and the configuration may be such that the air pressures are constantly detected and the rate of decrease in the air pressures is calculated from the detected change in the air pressures.

Third Embodiment

Next, the vehicle height adjusting device according to the third embodiment of the present disclosure will be described with reference to FIGS. 1, 2, 8, and 9. The same components as those in the first embodiment, etc. described above are denoted by the same reference signs and the description thereof will be omitted.

Figure 8:
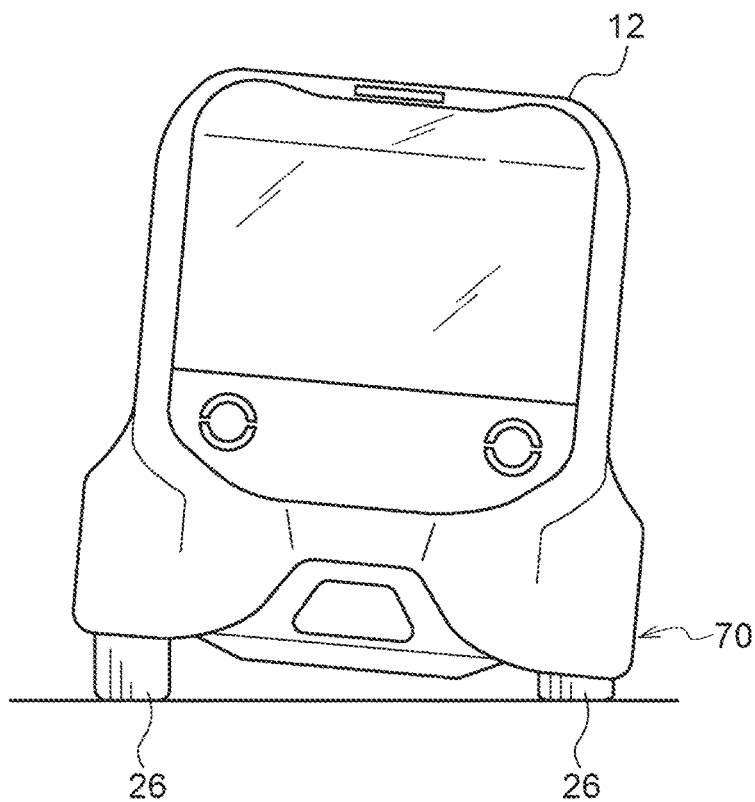
FIG. 8 is a front view showing an example of a second state of a vehicle having the vehicle height adjusting device according to the third embodiment.

A vehicle height adjusting device 70 according to the third embodiment has the same basic configuration as that of the first embodiment, and is characterized in that the expansion of the air spring corresponding to at least one tire 26 of the four tires 26 of the vehicle 12 is adjustable.
Overall Configuration That is, the vehicle height adjusting device 70 is provided in the vehicle 12 (see FIG. 8), and includes the air suspension device 14, the tire pressure detecting device 16, the display device 18, an operation device 72, and the control device 22. Each component is connected to each other via the in-vehicle network 23 (see FIG. 1). The operation device 72 is configured to include operation buttons for individually adjusting the expansion of the air springs corresponding to the four tires 26 of the vehicle 12. As a result, as shown in FIG. 8, only the side of the vehicle 12 where the entrance/exit is provided in the vehicle width direction is set in the second state, so that the vehicle height on the entrance/exit side is lowered to reduce the step height between the vehicle 12 and the ingress/egress platform.

This makes it easier for occupants to get on and off the vehicle.
Functional Configuration When executing the vehicle height adjusting program, the vehicle height adjusting device 70 realizes various functions using the above-described hardware resources. The functional configuration realized by the vehicle height adjusting device 70 will be described.

As shown in FIG. 2, the vehicle height adjusting device 70 has the air pressure detecting unit 38, a prediction unit 76, a vehicle height control unit 78, the display control unit 44, and a vehicle height adjusting unit 74 as the functional configuration. The CPU 28 of the control device 22 reads and executes the vehicle height adjusting program stored in the ROM 30 or the storage 34 (see FIG. 1), thereby realizing each functional configuration.

The prediction unit 76 acquires from the air pressure detecting unit 38 the air pressure information of the tire 26 at the portion where the vehicle height is adjusted and compares the air pressure of the tire 26 with the threshold. The prediction unit 76 predicts whether the drive battery 24 of the vehicle 12 interferes with the road surface based on the comparison result. Specifically, when the air pressure of the tire 26 at the portion where the vehicle height is adjusted is smaller than the threshold, the distance between the drive battery 24 of the vehicle 12 and the road surface is smaller than when the air pressure is larger than the threshold. If the transition from the first state to the second state is performed in this state, there is a high possibility that the drive battery 24 of the vehicle 12 interferes with the road surface. Therefore, when the air pressure of the tire 26 at the portion where the vehicle height is adjusted is smaller than the threshold, the prediction unit 76 predicts that the drive battery 24 of the vehicle 12 interferes with the road surface, and transmits the prediction result to the vehicle height control unit 42.

Further, even when the air pressure of the tire 26 at the portion where the vehicle height is adjusted is larger than the threshold, if there is a portion where the vehicle height is not adjusted, the prediction unit 76 compares the air pressures of the other tires 26 corresponding to the portions where the vehicle height is not adjusted with the threshold. When the air pressures are smaller than the threshold, the prediction unit 76 resets the threshold to a value that is set larger than the threshold, and compares the air pressure of the tire 26 at the portion where the vehicle height is adjusted with the threshold (changed threshold) again. That is, when the air pressures of the other tires 26 corresponding to the portions where the vehicle height is not adjusted are smaller than the threshold, the vehicle height may have already lowered even if the air pressure of the tire 26 at the portion where the vehicle height is adjusted is larger than the threshold. If the portion where the vehicle height is adjusted is transitioned from the first state to the second state in this state, the drive battery 24 of the vehicle 12 may interfere with the road surface. Therefore, the air pressure of the tire 26 corresponding to the portion where the vehicle height is adjusted is compared with the threshold that is reset (increased) to a value that takes into account the decrease in the vehicle height due to the fact that the air pressures of the other tires 26 corresponding to the portions where the vehicle height is not adjusted are smaller than the threshold. When the air pressure of the tire 26 at the portion where the vehicle height is adjusted is smaller than the threshold, the prediction unit 76 predicts that the drive battery 24 of the vehicle 12 interferes with the road surface, and transmits the prediction result to the vehicle height control unit 78.

The vehicle height control unit 78 controls the vehicle height adjusting unit 74 so that at least one tire 26 of the four tires of the vehicle 12 is set to either the first state or the second state based on the input from the operation device 72, and on receiving from the prediction unit 76 the prediction result that the drive battery 24 of the vehicle 12 interferes with the road surface, restricts the transition from the first state to the second state. When restricting the transition from the first state to the second state, the vehicle height control unit 78 transmits the information to the display control unit 44.

The vehicle height adjusting unit 74 controls the air suspension device 14 corresponding to the at least one tire 26 of the four tires 26 of the vehicle 12 according to the determination result of the vehicle height control unit 78. In the vehicle 12, the first state is the basic state.

Processing Flow

Figure 9:
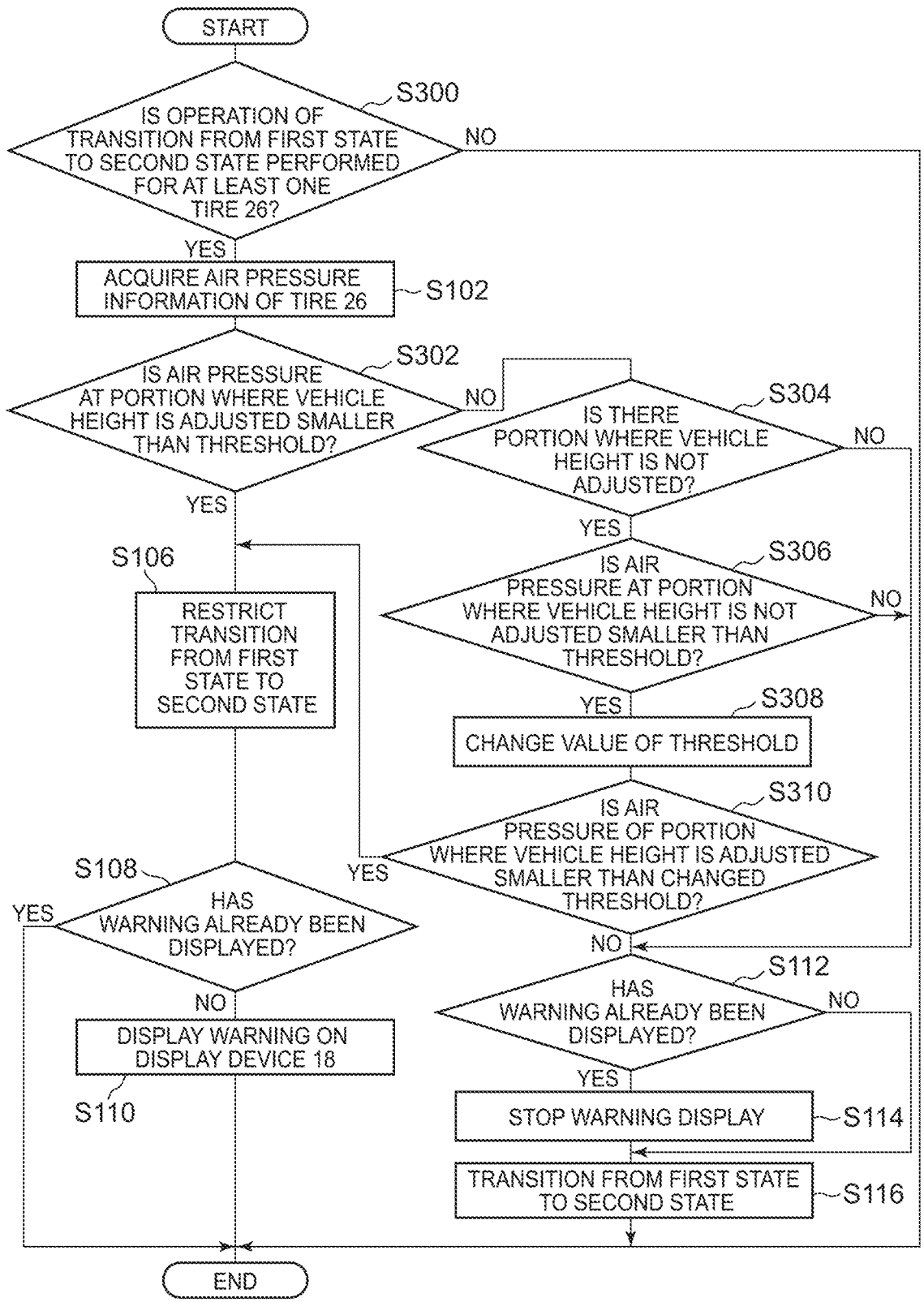
FIG. 9 is a flowchart showing an operation flow of the vehicle height adjusting device according to the third embodiment.

Next, the operation of the vehicle height adjusting device 70 will be described. FIG. 9 is a flowchart showing the flow of operation of the vehicle height adjusting device 10. The CPU 28 reads the vehicle height adjusting program from the ROM 30 or the storage 34, runs the program in the RAM 32, and executes the program, thereby performing the vehicle height adjustment. The same processes as those in the first embodiment are denoted by the same reference signs and the description thereof will be omitted.

The CPU 28 determines whether the at least one tire 26 of the four tires 26 of the vehicle 12 has been operated by the operation device 72 to transition from the first state to the second state (step S300). When the operation of the transition from the first state to the second state is not performed (step S300: NO), the CPU 28 ends the process based on the vehicle height adjusting program.

When the operation of the transition from the first state to the second state is performed (step S300: YES), the CPU 28 proceeds to the process of step S102.

After acquiring the air pressure information of each tire 26 from the tire pressure detecting device 16 in step S102, the CPU 28 determines whether the air pressure of the tire 26 that is operated to transition from the first state to the second state (at the portion where the vehicle height is adjusted) is smaller than the threshold (step S302). When the air pressure of the tire 26 at the portion where the vehicle height is adjusted is smaller than the threshold (step S302: YES), the CPU 28 proceeds to the process of step S106.

On the other hand, when the air pressure of the tire 26 at the portion where the vehicle height is adjusted is larger than the threshold (step S302: NO), the CPU 28 determines whether there is a portion where the vehicle height is not adjusted in the operation of the operation device 72 (step S304). When there is no portion where the vehicle height is not adjusted (that is, when the vehicle height of the entire vehicle 12 is adjusted) (step S304: NO), the CPU 28 proceeds to the process of step S112.

When there is a portion where the vehicle height is not adjusted (that is, when the vehicle height of a part of the vehicle 12 is adjusted) (step S304: YES), the CPU 28 determines whether the air pressures of the other tires 26 at the portions where the vehicle height is not adjusted are smaller than the threshold (step S306). When the air pressures of the other tires 26 at the portions where the vehicle height is not adjusted are larger than the threshold (step S306: NO), the CPU 28 proceeds to the process of step S112.

When the air pressures of the other tires 26 at the portions where the vehicle height is not adjusted are smaller than the threshold (step S306: YES), the CPU 28 increases the value of the threshold (step S308). Then, the CPU 28 determines whether the air pressure of the tire 26 at the portion where the vehicle height is adjusted is smaller than the threshold that has been changed in step S308 (step S310). When the air pressure of the tire 26 at the portion where the vehicle height is adjusted is larger than the threshold that has been changed in step S308 (step S310: NO), the CPU 28 proceeds to the process of step S112.

When the air pressure of the tire 26 at the portion where the vehicle height is adjusted is smaller than the threshold that has been changed in step S308 (step S310: YES), the CPU 28 proceeds to the process of step S106.

Operations and Effects of Third Embodiment

Next, operations and effects of the third embodiment will be described.

The above configuration is the same as that of the vehicle height adjusting device 10 of the first embodiment except that the expansion of the air spring corresponding to the at least one tire 26 of the four tires 26 of the vehicle 12 can be adjusted. Therefore, the same effect as that of the first embodiment can be obtained. Further, since the vehicle height adjusting unit 74 changes the at least one tire 26 of the plurality of tires 26 provided in the vehicle 12 to either the first state or the second state, it is possible to save energy as compared with the case of adjusting the vehicle height of the entire vehicle. Further, the prediction unit 76 changes the threshold that is compared with the air pressure of the tire 26 changed to either the first state or the second state by the vehicle height adjusting unit 74 to a value different from the threshold that is compared with the air pressure of the tire 26 at other portions. That is, when the drive battery 24 of the vehicle 12 has already approached the road surface, such as when the air pressure of the tire 26 that is transitioned to the second state has not decreased but the air pressures of the other tires 26 that are not transitioned to the second state have decreased, the threshold for the tire 26 that is transitioned to the second state can be made larger than the threshold for the other tires 26 that are not transitioned to the second state. As a result, when the air pressure of the tire 26 corresponding to the position where the vehicle height is adjusted has not decreased but the air pressures of the other tires 26 have decreased and thus the drive battery 24 of the vehicle 12 has approached the road surface, it is possible to suppress the lower portion of the vehicle 12 from interfering with the road surface due to the transition from the first state to the second state. As a result, it is possible to suppress interference between the drive battery 24 of the vehicle 12 and the road surface and save energy during the vehicle height adjustment at the same time.

Fourth Embodiment

Next, the vehicle height adjusting device according to the fourth embodiment of the present disclosure will be described with reference to FIGS. 10 to 12. The same components as those in the first embodiment, etc. described above are denoted by the same reference signs and the description thereof will be omitted.

A vehicle height adjusting device 80 according to the fourth embodiment has the same basic configuration as that of the first embodiment, and is characterized in that the vehicle height adjusting device 80 detects the road surface condition and determines whether the drive battery 24 of the vehicle 12 interferes with the road surface based on the detection result.

Overall Configuration

Figure 10:
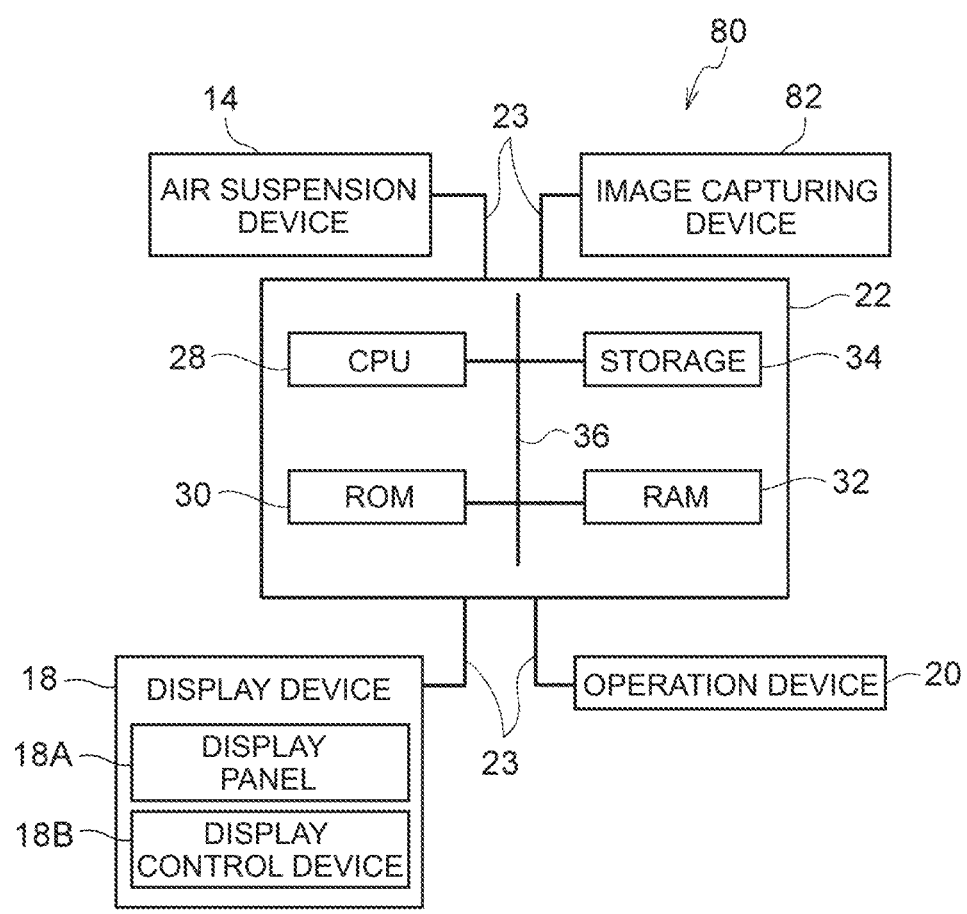
FIG. 10 is a block diagram showing a hardware configuration of a vehicle height adjusting device according to a fourth embodiment.

That is, the vehicle height adjusting device 80 is provided in the vehicle 12 (see FIGS. 4A and 4B), and includes the air suspension device 14, an image capturing device 82, the display device 18, the operation device 20, and the control device 22 as shown in FIG. 10. Each component is connected to each other via the in-vehicle network 23.

As an example, the image capturing device 82 is provided in the lower portion of the vehicle 12 and includes a camera that captures an image of the road surface on the lower side of the vehicle. The captured image is transmitted to the control device 22.

Functional Configuration

When executing the vehicle height adjusting program, the vehicle height adjusting device 80 realizes various functions using the above-described hardware resources. The functional configuration realized by the vehicle height adjusting device 80 will be described.

Figure 11:
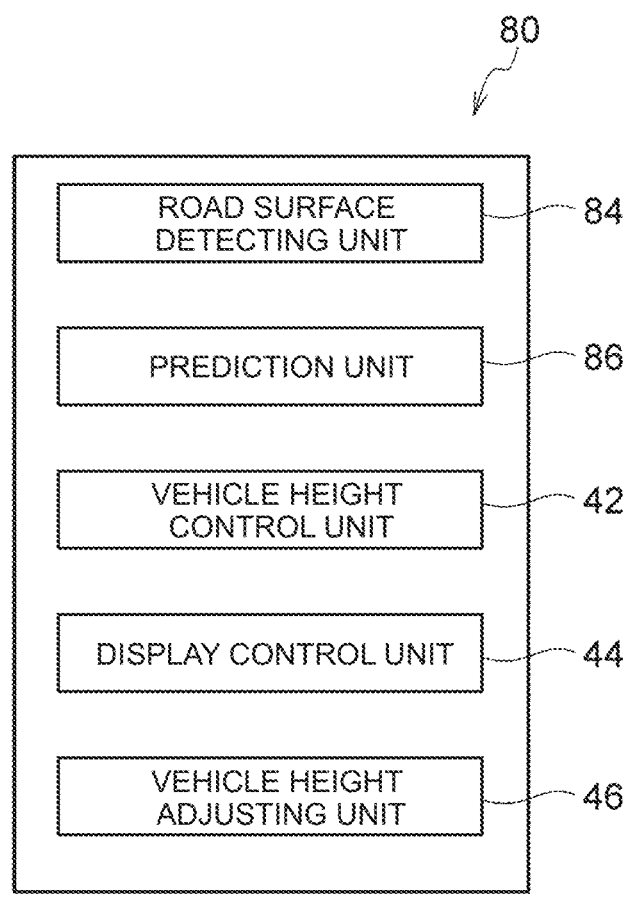
FIG. 11 is a block diagram showing a functional configuration of the vehicle height adjusting device according to the fourth embodiment.

FIG. 11 is a block diagram showing an example of the functional configuration of the vehicle height adjusting device 80.

As shown in FIG. 11, the vehicle height adjusting device 60 has a road surface detecting unit 84, a prediction unit 86, the vehicle height control unit 42, the display control unit 44, and the vehicle height adjusting unit 46 as the functional configuration. The CPU 28 of the control device 22 reads and executes the vehicle height adjusting program stored in the ROM 30 or the storage 34 (see FIG. 10), thereby realizing each functional configuration.

The road surface detecting unit 84 acquires the image taken by the image capturing device 82 and transmits the image to the prediction unit 86.

The prediction unit 86 detects the road surface condition based on the image received from the road surface detecting unit 84. Specifically, the prediction unit 86 analyzes the captured image to determine whether there is foreign matter, steps, or the like on the lower side of the vehicle 12. The prediction unit 86 calculates the distance between the road surface, the foreign matter or the like, if any, and the drive battery 24 or the like of the vehicle 12. When the prediction unit 86 determines from the presence/absence of the foreign matter or the like and the calculated distance that the drive battery 24 of the vehicle 12 is likely to interfere with the road surface or the foreign matter or the like due to the transition from the first state to the second state, the prediction unit 86 predicts that the drive battery 24 of the vehicle 12 interferes with the road surface, and transmits the result to the vehicle height control unit 42.

Processing Flow

Next, the operation of the vehicle height adjusting device 80 will be described. FIG. 12 is a flowchart showing the flow of operation of the vehicle height adjusting device 80. The CPU 28 reads the vehicle height adjusting program from the ROM 30 or the storage 34, runs the program in the RAM 32, and executes the program, thereby performing the vehicle height adjustment. The same processes as those in the first embodiment are denoted by the same reference signs and the description thereof will be omitted.

When the operation of the transition from the first state to the second state is performed in step S100 (step S100: YES), the CPU 28 causes the image capturing device 82 to capture the image of the road surface on the lower side of the vehicle (step S400). Then, the CPU 28 determines whether the drive battery 24 of the vehicle 12 interferes with the road surface, foreign matter, or the like based on the analysis result of the captured image (step S402). When the drive battery 24 of the vehicle 12 interferes with the road surface, foreign matter, or the like based on the analysis result of the captured image (step S402: YES), the CPU 28 proceeds to the process of step S106. On the other hand, when the drive battery 24 of the vehicle 12 does not interfere with the road surface, foreign matter, or the like based on the analysis result of the captured image (step S402: NO), the CPU 28 proceeds to the process of step S112.

Operations and Effects of Fourth Embodiment

Next, operations and effects of the fourth embodiment will be described.

The above configuration has the same configuration as the vehicle height adjusting device 10 of the first embodiment except that the road surface condition is detected and whether the drive battery 24 of the vehicle 12 interferes with the road surface is predicted based on the detection result. Therefore, the same effect as that of the first embodiment can be obtained. Further, since the prediction unit 86 predicts whether the drive battery 24 of the vehicle 12 interferes with the road surface from the road surface condition detected by the road surface detecting unit 84, it is possible to suppress the interference between the drive battery 24 of the vehicle 12 and the road surface based on the actual situation of the vehicle 12. Thus, it is possible to suppress the drive battery 24 of the vehicle 12 from interfering with the road surface during the vehicle height adjustment depending on various situations.

In the present embodiment, the road surface condition is detected based on the analysis result of the image captured by the image capturing device 82, but the present disclosure is not limited to this, and the road surface condition may be detected by a sensor that can acquire the road surface, a shape of a foreign matter, and distance information, such as a radar, an ultrasonic wave, and a laser imaging detection and ranging (LIDAR). Further, a configuration that predicts the interference based on the air pressures of the tires 26 as in the first to third embodiments may be combined.

Further, in the first to fourth embodiments described above, the occupant operates the vehicle 12 during the vehicle height adjustment, but the present disclosure is not limited to this. The vehicle height adjusting program may be automatically executed based on the position information of the vehicle 12, the determination result of a proximity sensor, and the like, in cases such as when the vehicle 12 arrives at a predetermined place such as a bus stop. Further, in cases such as when the power unit of the vehicle 12 is turned ON, the vehicle height adjusting program may be automatically executed at a timing before the operation of the vehicle 12 and the occupant may be notified before the operation of whether the transition from the first state to the second state is available.

Further, the interference between the drive battery 24 of the vehicle 12 and the road surface is suppressed, but the present disclosure is not limited to this, and the interference between the road surface and members other than the drive battery 24 such as suspension members may be suppressed.

Furthermore, the vehicle 12 is configured to be provided with four tires 26, but the present disclosure is not limited to this, and the vehicle 12 may be configured to be provided with three tires or five or more tires.

Although the embodiments of the present disclosure have been described above, it goes without saying that the present disclosure is not limited to the above embodiments, and various modifications other than the above can be carried out without departing from the spirit of the present disclosure.

What is claimed is:

1. A vehicle height adjusting device, comprising:
   a processor programmed to
      set a vehicle height to a first state or a second state, the first state being a state in which a tire of a vehicle is suspended at a predetermined position with respect to a vehicle body in a vehicle up-down direction, and the second state being a state in which the tire is suspended at a position closer to the vehicle body in the vehicle up-down direction than in the first state;
      predict whether a lower portion of the vehicle interferes with a road surface in the second state; and
   an air pressure sensor configured to detect an air pressure of the tire of the vehicle,
   wherein
      the processor is programmed to set the vehicle height to one of the first state and the second state, and restrict a transition from the first state to the second state in response to predicting an interference between the lower portion of the vehicle and the road surface, and the processor is programmed to calculate a remaining interference time until the lower portion of the vehicle interferes with the road surface, by using a rate of decrease in the air pressure of the tire of the vehicle, the rate of decrease in the air pressure of the tire being detected by the air pressure sensor, compare the detected air pressure with a predetermined threshold, and predict the interference between the lower portion of the vehicle and the road surface in response to (i) the detected air pressure being smaller than the predetermined threshold and (ii) the remaining interference time that has been calculated being shorter than a predetermined time.

2. The vehicle height adjusting device according to claim 1, wherein the processor is programmed to temporarily permit the transition from the first state to the second state in response to the detected air pressure being smaller than the predetermined threshold and the remaining interference time that has been calculated being longer than the predetermined time.

3. The vehicle height adjusting device according to claim 1, wherein the vehicle has a plurality of tires including the tire, the processor is programmed to change at least one tire of the plurality of tires provided in the vehicle to the one of the first state and the second state; and change a predetermined threshold that is compared with an air pressure of the at least one tire to a value different from a predetermined threshold that is compared with an air pressure of a further tire of the plurality of tires other than the at least one tire.

4. The vehicle height adjusting device according to claim 1, wherein the processor is programmed to predict whether the lower portion of the vehicle interferes with the road surface based on a road surface condition detected by a road surface sensor.

5. The vehicle height adjusting device according to claim 1, wherein the vehicle is equipped with a battery in the lower portion of the vehicle.

6. The vehicle height adjusting device according to claim 1, further comprising:

a display configured to display a warning to an occupant of the vehicle, in response to the transition from the first state to the second state being restricted.

7. The vehicle height adjusting device according to claim 1, wherein the processor is programmed to determine that the remaining interference time is shorter than the predetermined time in a case that the tire is damaged by a foreign matter, the predetermined time being a time required to change the vehicle height until the vehicle height reaches the first state.

8. The vehicle height adjusting device according to claim 1, wherein the vehicle has a first tire and a second tire, the first tire defining the tire, the vehicle has a first air pressure sensor configured to detect an air pressure of the first tire and a second air pressure sensor configured to detect an air pressure of the second tire, the first air pressure sensor defining the air pressure sensor, the processor is programmed to change the first tire from the first state to the second state and not change the second tire from the first state to the second state, and in response to a determination that (i) the air pressure of the first tire that is changed to the second state has not decreased and (ii) the air pressure of the second tire that is not changed to the second state have decreased, change the predetermined threshold for the first tire to a value larger than the predetermined threshold for the second tire.

* * * * *